United States Patent

[11] 3,575,421

[72] Inventor Yoshiro Kato
Yokohama, Japan
[21] Appl. No. 708,685
[22] Filed Feb. 27, 1968
[45] Patented Apr. 20, 1971
[73] Assignee Victor Company of Japan, Limited
Yokohama, Japan
[32] Priority Mar. 3, 1967
[33] Japan
[31] 42/17804

[54] TAPE CARTRIDGE REJECTION APPARATUS
2 Claims, 3 Drawing Figs.

[52] U.S. Cl. .......... 274/4
[51] Int. Cl. .......... G11b 5/00
[50] Field of Search .......... 274/4, 11; 179/100.2 (Z); 242/197—200

[56] References Cited

UNITED STATES PATENTS 3,009,024 11/1961 Eash .......... 274/4(C)
3,285,526 11/1966 Moore .......... 179/100.2(Z)
3,437,762 4/1969 Lear et al. .......... 274/4(A)
3,445,116 5/1969 Knox .......... 179/100.2(Z)
3,486,675 12/1969 Krechman .......... 274/4B

FOREIGN PATENTS 938,238 10/1963 Great Britain .......... 179/100.2(Z)

*Primary Examiner*—Harry N. Haroian
*Attorney*—Holman, Glascock, Downing & Seebold

ABSTRACT: A tape cartridge rejection apparatus having a tape cartridge formed with a recess in a side thereof, a leaf spring having thereon a guide member adapted to be urged into the recess to hold in the same position, the urging force exerted to the cartridge by the leaf spring being designed to be released at any desired time, a pushing-out rod for rejecting the cartridge by pushing a forward end thereof so that a rear end of the cartridge is moved beyond a tape recorder body to some extent for thereby disengaging a pinch roller within the cartridge from its pressing contact with a capstan of the recorder whereby the pinch roller is prevented from being deformed. The rejection apparatus is operable either at the termination of a reproducing operation of each of the channels or at any desired time during the reproducing operation thereof.

Patented April 20, 1971 3,575,421

2 Sheets-Sheet 1

Yoshiro Kato INVENTOR

BY Glascock, Downing & Seebold

ATTORNEYS

TAPE CARTRIDGE REJECTION APPARATUS

BACKGROUND OF THE INVENTION

The present invention relates to an apparatus for rejecting a tape cartridge and more particularly to an apparatus for use with a tape-cartridge-type tape recorder, which apparatus is operable at any desired time to reject the tape cartridge by pushing out or ejecting the same from the tape recorder.

Generally, a tape-cartridge-type tape recorder has therein a capstan which, upon insertion of a tape cartridge, is cooperable with a pinch roller mounted within the cartridge to forcibly pinch a web of magnetic tape and drive the tape for a reproducing operation. With a conventional tape-cartridge-type tape recorder, as a tape cartridge is kept in its operative position, the pinch roller of the cartridge is also kept forcibly contacting the capstan and would be deformed. Such deformation adversely affects the quality of reproduced sounds. It has, therefore, been necessary to manually draw a tape cartridge out of the tape recorder at times such as after completion of a reproducing operation.

On the other hand, the field of manufacturing automobiles and parts therefor has a recent tendency to avoid attaching articles which otherwise would project into the occupant space of a car. This leads to a requirement that a tape-cartridge-type tape recorder, if designed for use in an automobile, receives completely a cartridge therein so that even a part of the cartridge does not projecting from the tape recorder housing. For satisfying the requirement, therefore, is indispensable an automatically or manually operable mechanism for pushing-out and rejecting a cartridge at any time such as at a time of completion of a reproducing operation.

SUMMARY OF THE INVENTION

Thus, the present invention contemplates automatically pushing a tape cartridge out of an associated tape recorder at any desired time, for example at the time when a reproduction is finished of a recorded information, to prevent a pinch roller from being deformed as well as to simplify a handling of a tape-cartridge-type tape recorder.

A primary object of the present invention is to provide a tape cartridge rejection apparatus which is operable to automatically push a tape cartridge out of the interior of an associated tape recorder at any desired time such as at a time of completion of or at a time during a reproducing operation for preventing a pinch roller of the cartridge from being deformed.

A further object of the present invention is to provide a tape cartridge rejection apparatus which is operable to push a tape cartridge out of an associated tape recorder for preventing a pinch roller of the cartridge from being deformed and which, upon the pushing out operation, cuts off a feed of electrical power source for a capstan motor and an amplifier to avoid a waste of electrical power.

A still further object of the present invention is to provide a tape cartridge rejection apparatus which is operable to automatically force a tape cartridge out of an associated tape recorder upon completion of a reproduction of a signal recorded along each of the channels in a tape for thereby preventing a pinch roller of the recorder from being deformed.

BRIEF DESCRIPTION OF THE DRAWINGS

Other objects and features of the present invention will be apparent from the following description with reference to the accompanying drawings in which.

DETAILED DESCRIPTION OF THE INVENTION

Figure 1:
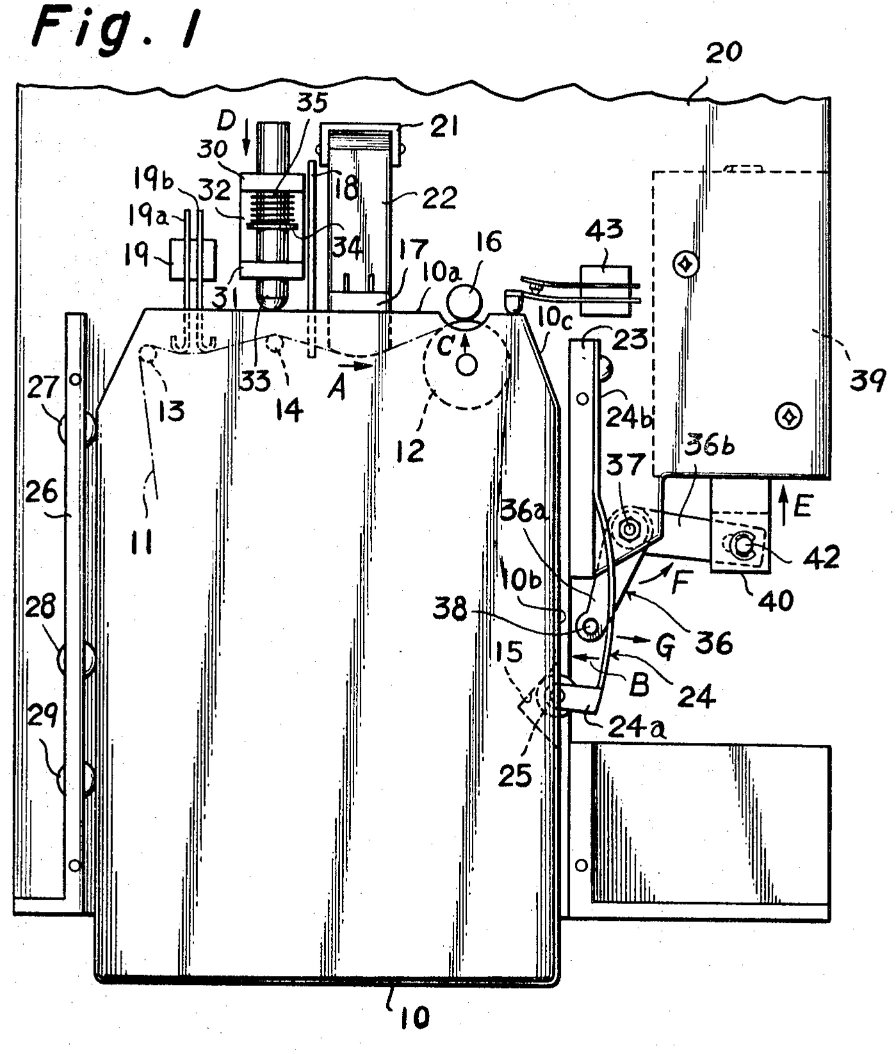
FIG. 1 is a plan view of an embodiment of the apparatus according to the present invention.
Figure 2:
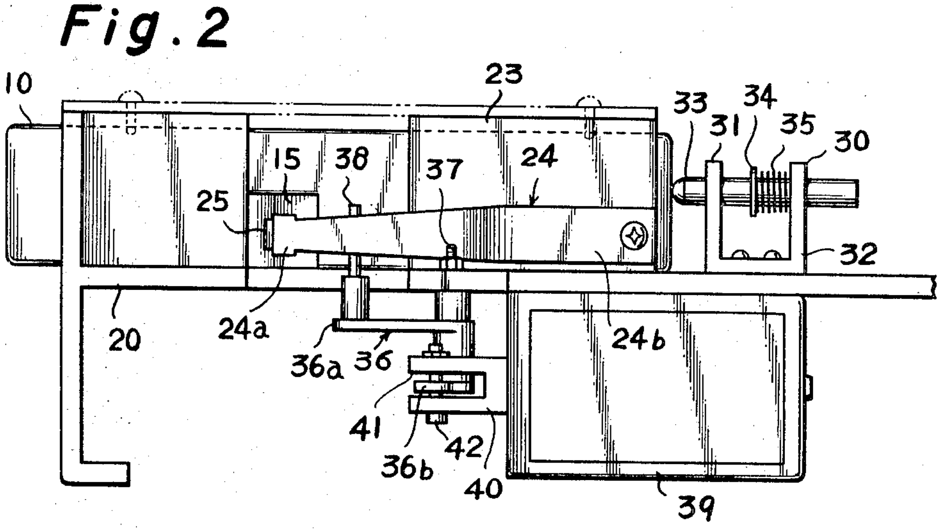
FIG. 2 is a side elevation view of an important portion of the apparatus shown in FIG. 1.

FIGS. 1 and 2 show an embodiment of the apparatus according to the present invention and in which numeral 10 denotes a tape cartridge which houses an endless magnetic tape 11. The cartridge 10 also houses a pinch roller 12 and tape guide poles 13 and 14 disposed adjacent a front face of forward end 10*a* of the cartridge. The tape 11 is adapted to be advanced and guided along the cartridge forward end 10*a* by the inch roller 12 and the guide poles 13 and 14. A V-shaped notch 15 is formed in a side face 10*b* of the tape cartridge. The cartridge is adapted to be inserted into and drawn out of a tape recorder chassis 20.

Within the tape recorder are provided a capstan 16, a magnetic head 17, a tape guide 18 and a sensor 19. These members are so located that, when the tape recorder is loaded with the cartridge 10, the capstan 16 is brought into contact with the pinch roller 12 and the other members 17, 18 and 19 are brought into contact with the tape 11 through a window (not shown) and thus, the capstan 16, when rotated by a capstan motor (not shown), drives or advances the tape 11 in a direction indicated by an arrow A.

The magnetic head 17 is fixed to the free end of a head arm 22 which is pivotably supported by a bracket 21 which in turn is secured at one end to the tape recorder chassis 20. The head arm 22 is designed to be moved stepwise by appropriate means such as a step-cam (not shown) to vary a height of the magnetic head 17 into alignment with the respective channels on the magnetic tape so as to perform a changeover of tracks. For example, when a magnetic tape carries information or signals recorded on four channels, the magnetic head may have four positions to be changed over step by step.

The tape guide 18 is for supporting the tape 11 to keep the level thereof fixed. In this sense, the tape guide 18 constitutes a standard of the tracking changeover mechanism for the magnetic head 17.

The sensor 19 consists of a pair of contacts 19*a* and 19*b* arranged in opposing relation and serves to sense a sensing tape which is preliminarily applied onto the tape 11 at a location corresponding to a termination of recorded information.

The tape recorder chassis 20 includes a sideplate 23 which has a leaf spring 24 secured thereto at its rear end 24*b*. A guide or roller 25 is rotatably mounted on a forward end 24*a* of the spring 24. It will be noted from the illustrated arrangement that, when the tape recorder is loaded with the tape cartridge 10, the roller 25 is urged into the V-shaped notch 15 in the cartridge side and into pressing engagement with the left-hand surface of the V-notch 15 by the pressure exerted by the leaf spring 24 in the direction indicated by an arrow B, assuring that the tape cartridge is held in its operating position in a stabilized state and that the pinch roller 12 is continuously pressed against the capstan 16 in the direction indicated by an arrow C through the magnetic tape therebetween.

A second sideplate 26 is provided in opposite relation to the first sideplate 23 and at a location spaced therefrom by a distance substantially equal to the width of the tape cartridge 10. The second sideplate 26 has a series of guide rollers 27, 28 and 29 rotatably mounted therein for facilitating smooth insertion and withdrawal of the cartridge 10 into and out of the tape recorder as well as for holding the cartridge in its playing or operating position.

A supporting plate 32 is mounted on the tape recorder chassis 20. The plate 32 includes a bearing portions 30 and 31 which slidably support a pushing rod 33 for pushing out the tape cartridge 10. The pushing rod 33 is disposed at such a location that the forward end 10*a* of a tape cartridge 10, when inserted into the tape recorder, is brought into pressing contact at substantially an intermediate portion thereof with the pushing rod 33 to urge and retract the latter against a compression coil spring 35. The spring 35 extends between the bearing portion 30 and a washer 34 limiting the sliding movement of the pushing rod 33 and is energized when in compressed state to bias the rod 33 continuously in a direction as shown by an arrow D, or in other words, in the direction that the tape cartridge 10 is ejected. The force of the spring 35 effective in the direction D provided by the resiliency thereof being smaller than the force afforded by the leaf spring 24 and holding the cartridge 10 in its playing position.

A generally L-shaped lever 36 is pivotably mounted at its bend portion onto the tape recorder chassis 20 by means of a shaft 37 at a location adjacent the leaf spring 24. The lever 36 has a pin 38 at one end **36*a* which may be moved and brought into engagement with the leaf spring 24 against the resiliency thereof to release the pressure force of the roller 25 applied by the spring 24. The other end 36*b* of the lever 36 is received in a recess 41 in a movable iron core 40 of an electromagnet 39 and is rotatably supported by a shaft 42**.

An electrical switch 43 is provided at such a position as to be engaged at an actuator thereof by the forward end **10*a* of the cartridge 10 when the cartridge is placed into the recorder. The switch 43 is for closing, upon insertion of the cartridge 10**, an electrical power circuit for the capstan motor and an amplifier and also for opening the circuit when the cartridge is pushed out or ejected.

Figure 3:
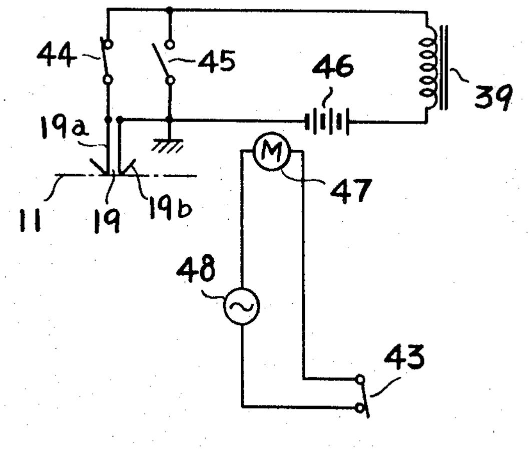
FIG. 3 is a diagrammatical circuit of an embodiment of the electrical circuit utilized in the apparatus.

FIG. 3 diagrammatically illustrates an embodiment of an electrical circuit applicable to the apparatus of the present invention. The sensor 19 is connected in series with a first electrical contact 44. A second electrical contact 45 is connected in parallel with the sensor 19 and the first contact 44. The parallel circuit is connected in series with the electrical magnet 39 and a power source 46 as illustrated. The contacts 44 and 45 are adapted to be opened and closed by switches disposed at appropriate locations of the tape recorder chassis 20.

Also connected in series as illustrated are the electrical power source switch 43 operable in operative association with an inserting and pushing-out operation of the tape cartridge 10, an electrical circuit 47 for the capstan motor and the amplifier, and a power source 48.

The operation of the above-described mechanism is as follows.

When it is desired that a tape cartridge be automatically rejected after completion of a reproducing operation, the electrical circuit is preliminarily set such that the first contact 44 is closed while the second contact 45 is opened. When the magnetic tape has run and a reproduction of a recorded information is completed, a conductive sensing tape applied to the magnetic tape at the location corresponding to the termination of the information recorded thereon is brought into contact with the sensor 19 to electrically close the contacts **19*a* and 19*b* for forming a closed circuit including the electromagnet 39 and power source 46 whereupon the electromagnet 39 becomes operative to pull the movable core 40 in a direction as shown by an arrow E. Thus, the lever 36 journaled onto the movable core 40 is rotated about the shaft 37 in a direction indicated by an arrow F, with the result that the pin 38 upstanding from the end 36*a* of the lever 36 is moved to shift the leaf spring 24 in a direction to release the pressure exerted thereby against the tape cartridge 10, that is, in a direction indicated by an arrow G, to thereby detach the roller 25 from the V-shaped notch 15 in the tape cartridge 10. Consequently, the tape cartridge 10 is freed from the grip which has been provided by the leaf spring 24 through the roller 25 and, therefore, the pushing rod 33 is actuated by the resiliency of the coil spring 35 to move in the direction D and push the cartridge 10 partially out of the tape recorder chassis 20**.

The distance that the tape cartridge 10 is pushed out depends on the location of the washer 34 on the pushing rod 33. The arrangement of the instant embodiment in this respect is such that the distance is less than that between the V-shaped notch 15 in the cartridge side **10*b* and a tapered portion 10*c*** of the cartridge.

In synchronism with pushing out the tape cartridge, the electrical power switch 43 is opened to render the electrical circuit including power circuit 47 for the capstan motor and the amplifier and the electrical power source 48 opened whereby the capstan motor is deenergized and stopped.

In a case where it is desired that, after completion of a reproducing operation of a recorded information, a reproduction of the same information is again performed or a reproduction of a next recorded information is sequentially performed, the first and the second electrical contacts 44 and 45 are both held opened. This keeps the electrical magnet 39 inoperative even if the sensing tape on the magnetic tape electrically closes the sensor, resulting in a fact that the tape cartridge 10 is held in its operative position and the reproducing operation is continuously performed.

It is also possible that the cartridge 10 is rejected in the midst of a reproducing operation. This is carried out by closing the second electrical contact 45 at any desired time during the reproducing operation for closing the circuit including the electromagnet 39 and the power source 46 to energize the electromagnet whereby the tape cartridge 10 is rejected in a similar manner to that above described.

In the embodiment described with reference to the drawings, the pin 38 mounted on and upstanding from the substantially L-shaped lever 36 is utilized to bring the lever into engagement with the leaf spring 24. The pin 38, however, may be replaced with a projection upstanding from the end of the lever or with such an arrangement that pinches the leaf spring.

Furthermore, the substantially L-shaped lever 36 used for releasing the pressure force exerted by the leaf spring 24 may be replaced by, for example, a movable iron core of an electromagnet which may directly be used to release the pressure force of the leaf spring.

As described hereinabove, the apparatus of the present invention is operable to automatically reject a tape cartridge after completion of a reproducing operation, continuously hold the tape cartridge in its operating position for a further reproduction or reject the cartridge at any desired time during reproducing operation. Thus, it can be eliminated that the pinch roller is deformed by the pressing contact with the capstan while no reproduction is performed and that the reproduced sounds are lowered in quality by such deformation of the pinch roller.

Moreover, since an electrical circuit, for example, the one for the capstan motor and the amplifier, may be opened at the same time that the tape cartridge is rejected, a waste of electrical power and an unnecessary wear of the machine parts can be minimized.

The apparatus as described with reference to the accompanying drawings is of only an embodiment of the present invention and may be modified in various ways within the scope of the invention as defined in the appended claims.

I claim:

1. A tape cartridge rejection apparatus comprising a tape cartridge housing a magnetic tape, a pinch roller and having a recess in a side thereof, a chassis, cartridge guiding means on said chassis for smooth insertion and withdrawal of the tape cartridge, a retention member mounted on said chassis at one end thereof, urging means for urging said retention member into pressing engagement with said recess in response to a full insertion of the tape cartridge so as to hold the cartridge in position in cooperation with said guiding means, a capstan mounted on said chassis and disposed to press a portion of the magnetic tape against the pinch roller in response to the full insertion of the tape cartridge for driving the magnetic tape, a motor for driving said capstan, a magnetic head mounted on said chassis and disposed at such a location as to contact the magnetic tape in response to the full insertion of the tape cartridge, conductor means for detecting an electrically conductive sensing tape applied to said magnetic tape at a location corresponding to a termination of a reproducing operation of said magnetic tape, an electromagnet mounted on said chassis, an electrical power source for energizing said electromagnet, a first manually operable switch connected in series with said conductor means, a second manually operable switch connected in parallel with the series combination of said first manually operable switch and said conductor means, means for supplying a voltage across said second manually operable switch through said electromagnet from said electrical power source, means for releasing the retention member out of said recess against the urging force of said urging means in response to the energization of the electromagnet, and means on said chassis for pushing out said tape cartridge in response to the operation of said releasing means.

2. A tape cartridge rejection apparatus comprising a tape cartridge housing a magnetic tape, a pinch roller and having a recess in a side thereof, a chassis, cartridge-guiding means on said chassis for smooth insertion and withdrawal of the tape cartridge, a retention member mounted on said chassis at one end thereof, urging means for urging said retention member into pressing engagement with said recess in response to a full insertion of the tape cartridge so as to hold the tape cartridge in position in cooperation with said guiding means, a capstan mounted on said chassis and disposed to press a portion of the magnetic tape against the pinch roller in response to the full insertion of the tape cartridge for driving the magnetic tape, a motor for driving said capstan, a magnetic head mounted on said chassis and disposed at such a location as to contact the magnetic tape in response to the full insertion of the tape cartridge, conductor means for detecting an electrically conductive sensing tape applied to said magnetic tape at a location corresponding to a termination of a reproducing operation of said magnetic tape, an electromagnet mounted on said chassis and having a movable iron core, an electrical power source for energizing said electromagnet, a first manually operably switch connected in series with said conductor means, a second manually operable switch connected in parallel with the series combination of said first manually operably switch and said conductor means, means for supplying a voltage across said second manually operable switch through said electromagnet from said electrical power source, a shaft mounted on said chassis, a lever of substantially L-shaped configuration rotatably supported on said shaft, one end of said lever being rotatably received in the movable iron core of said electromagnet and the other end of said lever engaging with and releasing said retention member out of said recess against the urging force of said urging means in response to the energization of the electromagnet, and means on said chassis for pushing out said tape cartridge in response to the releasing action of said lever.